US009661499B2

(12) United States Patent
Hunt et al.

(10) Patent No.: US 9,661,499 B2
(45) Date of Patent: May 23, 2017

(54) ACCESS CONTROL AUTHENTICATION BASED ON IMPEDANCE MEASUREMENTS

(71) Applicant: Sony Corporation, Tokyo (JP)

(72) Inventors: Alexander Hunt, Tygelsjö (SE); David de Léon, Lund (SE); Lars Nord, Lund (SE); Ola Thörn, Limhamn (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 349 days.

(21) Appl. No.: 14/561,823

(22) Filed: Dec. 5, 2014

(65) Prior Publication Data

US 2016/0165450 A1     Jun. 9, 2016

(51) Int. Cl.
| | | |
|---|---|---|
| *H04W 12/08* | (2009.01) | |
| *G06F 3/041* | (2006.01) | |
| *G06F 3/0488* | (2013.01) | |
| *G06F 21/32* | (2013.01) | |
| *G06F 21/45* | (2013.01) | |
| *H04W 12/06* | (2009.01) | |
| *G06F 21/31* | (2013.01) | |

(52) U.S. Cl.
CPC .......... *H04W 12/08* (2013.01); *G06F 3/0412* (2013.01); *G06F 3/0416* (2013.01); *G06F 3/04883* (2013.01); *G06F 21/316* (2013.01); *G06F 21/32* (2013.01); *G06F 21/45* (2013.01); *H04W 12/06* (2013.01)

(58) Field of Classification Search
CPC ..... H04W 12/08; H04W 12/06; G06F 3/0412; G06F 3/0416; G06F 3/04883; G06F 21/32; G06F 21/45; G06F 21/316
See application file for complete search history.

(56) References Cited

U.S. PATENT DOCUMENTS

| | | | |
|---|---|---|---|
| 2003/0133596 A1* | 7/2003 | Brooks | G06K 9/00 382/115 |
| 2003/0226041 A1* | 12/2003 | Palmer | G06Q 20/327 726/5 |
| 2004/0123106 A1* | 6/2004 | D'Angelo | G06F 21/32 713/171 |

(Continued)

OTHER PUBLICATIONS

International Search Report and Written Opinion from corresponding International Application No. PCT/US2015/033159, dated Nov. 10, 2015.

*Primary Examiner* — Darren B Schwartz
(74) *Attorney, Agent, or Firm* — Tucker Ellis LLP

(57) ABSTRACT

A computing device may be configured to authenticate a user for access control, and may include at least one ground electrode configured for contact with a user, an impedance sensor coupled to the least one ground electrode, where the impedance sensor may be configured to perform a measurement based on a touch input from the user, a memory which stores instructions, and a processor, coupled the impedance sensor and the memory, where the processor may be configured to execute the instructions. The instructions may cause the processor to: receive the touch input from the user, receive an impedance value based on the touch input measured by the impedance sensor, and determine whether the received impedance value corresponds to at least one stored impedance value associated with a user profile.

21 Claims, 8 Drawing Sheets

(56) References Cited

U.S. PATENT DOCUMENTS

| | | | |
|---|---|---|---|
| 2006/0047970 A1* | 3/2006 | Mochizuki | G06K 9/00 713/186 |
| 2007/0063816 A1* | 3/2007 | Murakami | G07F 7/1008 340/5.82 |
| 2007/0177770 A1* | 8/2007 | Derchak | G06K 9/00496 382/115 |
| 2008/0113650 A1* | 5/2008 | Engstrom | H04M 1/021 455/411 |
| 2008/0195870 A1* | 8/2008 | Posamentier | G06F 21/32 713/186 |
| 2012/0218218 A1 | 8/2012 | Kauko | |
| 2014/0084949 A1* | 3/2014 | Smith | A61B 5/441 324/693 |
| 2014/0085050 A1* | 3/2014 | Luna | G07C 9/00087 340/5.82 |
| 2014/0165185 A1* | 6/2014 | Lange | G06K 9/00892 726/19 |
| 2014/0298450 A1* | 10/2014 | Lymberopoulos | G06F 1/1684 726/19 |
| 2014/0372762 A1* | 12/2014 | Flautner | H04L 9/3226 713/173 |
| 2016/0050217 A1* | 2/2016 | Mare | H04L 9/3215 726/4 |

* cited by examiner

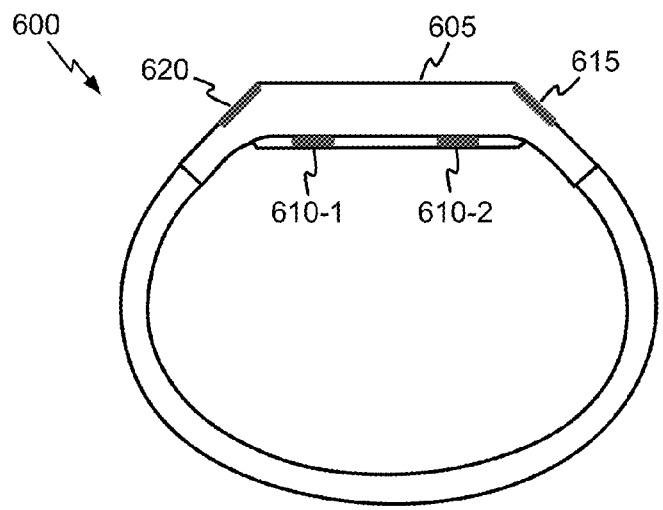
Fig. 6A
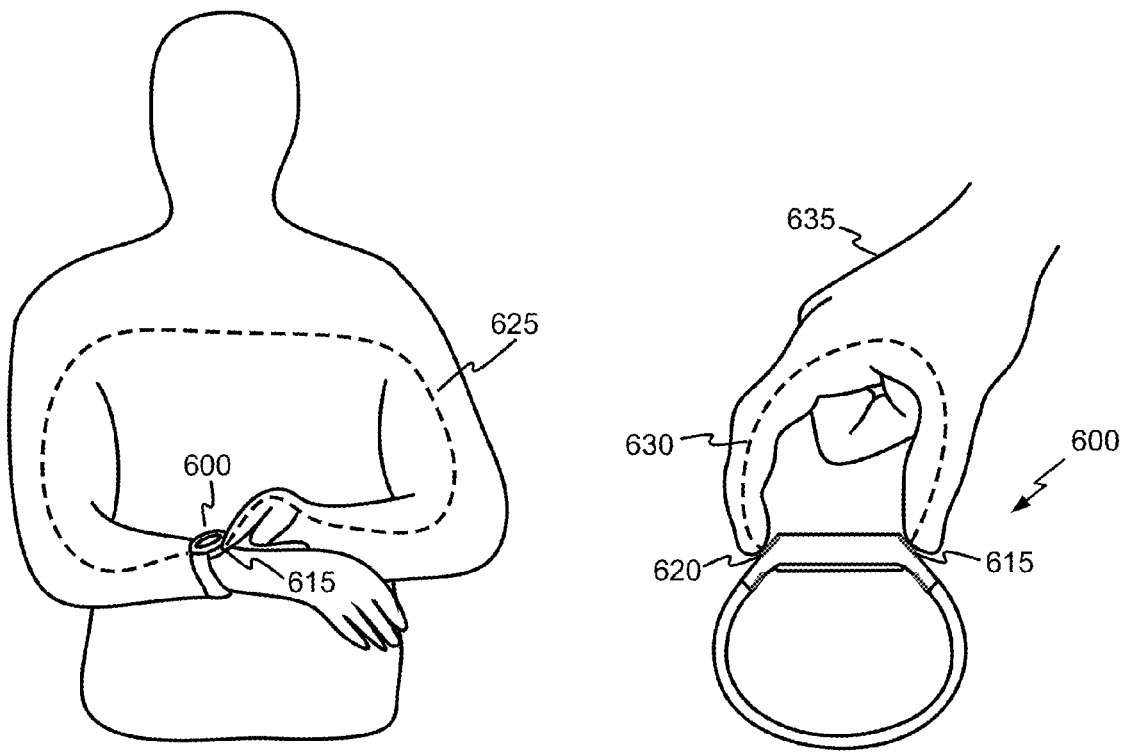
Fig. 6B
Fig. 6C

ACCESS CONTROL AUTHENTICATION BASED ON IMPEDANCE MEASUREMENTS

BACKGROUND INFORMATION

Manufacturers have traditionally provided access control as a security feature for authenticating users. Access control authentication allows authorized users to securely access their mobile devices while preventing access to unauthorized individuals. However, conventional authentication approaches for access control, such as passwords and Personal Identification Numbers (PINs), may require extra user effort and thus be inconvenient. Other methods, such as fingerprint scanners and facial recognition, may be less intrusive on the part of the user, but rely on additional hardware and/or software and may increase cost and complexity.

SUMMARY OF THE INVENTION

According to one aspect, a method for authenticating a user for access control may be performed by a computing device. The method may include receiving a touch input from a user, measuring an impedance value based on the touch input, and determining whether the measured impedance value corresponds to at least one stored impedance value associated with a user profile.

Additionally, the method may further include providing an indication to the user upon determining the measured impedance value corresponds to at least one impedance value associated with the user profile, wherein the indication is at least one of an audio signal, a tactile signal, or a visual signal.

Additionally, upon determining the measured impedance value corresponds to at least one impedance value associated with the user profile, the method may further include transmitting to a second device an indication of a positive user identification. Additionally, when the touch input is received on a surface of a touchscreen display, the method may further include unlocking a device based on the touch input, and activating the user profile in response to determining that the measured impedance value corresponds to at least one stored impedance value associated with the user profile.

Additionally, when in response to determining that the measured impedance value fails to correspond to any stored impedance value associated with the user profile, the method may further include requesting user authentication credentials from the user, receiving, from an additional touch input by the user, user authentication information through the touchscreen display surface of the device, determining the user authentication credentials matches the user profile, measuring an additional impedance value based on the additional touch input, storing the additional impedance value for the user's profile matching the authentication information, and activating the user profile matching the user authentication information.

Additionally, the method may include receiving additional touch inputs from the user, and performing ongoing impedance value measurements based on the additional touch input to refine the at least one stored impedance value associated with a user profile. Additionally, receiving touch input may further include receiving at least one of a personal identification number (PIN) entry, a tap, a swipe gesture, or a path defined by a gesture.

Additionally, measuring the impedance value may include measuring the impedance value associated with a long loop which includes a path traversing a chest of the user, and further includes a first long loop termination point on a first hand in contact with a touchscreen display surface of a device, and a second long loop termination point on a second hand in contact with at least one ground electrode of the device, or measuring the impedance value associated with a short loop which includes a path traversing the first hand of the user, and further includes a first short loop termination point on the first hand in contact with the touchscreen display surface of the device, and a second short loop termination point on the first hand in contact with the at least one ground electrode of the device.

Additionally, the method may include measuring the impedance value which may include using the measured impedance value associated with the short loop with at least one of a personal identification number (PIN) or a gesture associated with a touchscreen display surface, or measuring additional impedance values associated with a plurality of loops, wherein at least one of the plurality of loops traverses a distinct path of a body of the user.

Additionally, when activating the user profile, the method may include activating the user profile which includes a security classification, wherein the security classification further includes an owner profile, a standard user profile, or a guest profile, or activating the user profile associated with a specific individual. Additionally, the method may include activating the user profile which includes an age classification, wherein the age classification further includes an adult profile or a child profile. Additionally, the method may include presenting a user interface on the touchscreen display based upon the activated user profile.

Additionally, the method may include activating a device, entering a calibration mode, providing calibration instructions to the user, measuring calibration data, and storing at least one impedance value associated with the user profile based on the measured calibration data.

According to one aspect, a computing device may authenticate a user for access control based on measured impedance values. The computing device may include at least one ground electrode configured for contact with a user; an impedance sensor coupled to the least one ground electrode, where the impedance sensor is configured to perform a measurement based on a touch input from the user; a memory which stores instructions; and a processor, coupled the impedance sensor and the memory, where the processor is configured to execute the instructions causing the processor to: receive the touch input from the user, receive an impedance value based on the touch input measured by the impedance sensor, and determine whether the received impedance value corresponds to at least one stored impedance value associated with a user profile. Additionally, the computing device may include instructions causing the processor to transmit to a second device an indication of a positive user identification.

Additionally, the computing device may include a touchscreen display coupled to the processor and impedance sensor, where the instructions cause the processor to unlock the device based on the touch input, and activate the user profile in response to determining the received impedance value corresponds to at least one stored impedance value associated with the user profile.

Additionally, when the processor determines the measured impedance value fails to correspond to any stored impedance value associated with the user profile, the instructions may cause the processor to: request user authentication credentials from the user, receive, from an additional touch input by the user, user authentication information on a surface of the touchscreen display, determine that the user authentication credentials matches the user profile, measure an additional impedance value based on the additional touch input, store the additional impedance value for the user's profile matching the authentication information, and activate the user profile matching the user authentication information.

Additionally, the computing may include instructions causing the processor to receive additional touch inputs from the user, and perform ongoing impedance value measurements based on the additional touch input to refine the at least one stored impedance value associated with the user profile.

Additionally, the impedance sensor of the computing device may be configured to measure the impedance value associated with a long loop which includes a path traversing a chest of the user, and further includes a first long loop termination point on a first hand in contact with a surface of a touchscreen display, and a second long loop termination point on a second hand in contact with the at least one ground electrode of the device, or measure the impedance value associated with a short loop which includes a path traversing the first hand of the user, and further includes a first short loop termination point on the first hand in contact with a surface of the touchscreen display, and a second short loop termination point on the first hand in contact with the at least one ground electrode of the device. Additionally, the impedance sensor may be configured to measure additional impedance values associated with a plurality of loops, wherein at least one of the plurality of loops traverses along a distinct path of a body of the user.

Additionally, the computing device may include instructions for activating the user profile further cause the processor to: activate the user profile which includes a security classification, wherein the security classification further includes an owner profile, a standard user profile, or a guest profile, or activate the user profile which includes an age classification, wherein the age classification further includes an adult profile or a child profile.

According to another aspect, a device may measure at least one impedance value for user authentication. The device may include a strap which is configured to couple to a user, and ground electrode(s) connected to a first side of the strap. The device may further include first signal electrode(s) connected to the first side of the strap, and signal electrode(s) connected to a second side of the strap. The device may further include an impedance sensor coupled to the at least one ground electrode and the at least one first signal electrode and the at least one second signal electrode, where the impedance sensor determines a measurement based on touch input from the at least one ground electrode and the at least one first signal electrode or the at one second signal electrode. The device may further include a controller coupled to the impedance sensor, where the controller is configured to receive the measurement and determine an impedance value, and communications interface(s) coupled to the controller, where the communication interface is configured to receive the impedance value from the controller and transmit the received impedance value to a computer device for authentication of the user.

Additionally, where the impedance sensor is configured to determine a long loop measurement which includes a path traversing across a chest of the user, and further includes a first long loop termination point on a first hand in contact with at least one ground electrode connected to the first side of the strap, and a second long loop termination point on a wrist corresponding to a second hand, wherein the wrist is in contact with at least one second signal electrode connected to the second side of the strap. The impedance sensor may additionally, or alternatively, determine a short loop measurement which includes a path traversing across the first hand of the user, and further include a first short loop termination point on the first hand in contact with at least one ground electrode connected to the first side of the strap, and a second short loop termination point on the first hand in contact with at least one first signal electrode connected to the first side of the strap.

BRIEF DESCRIPTION OF THE DRAWINGS

FIG. 6A is an diagram of an exemplary wearable device for determining impedance measurements;

FIG. 6B is a diagram depicting an exemplary long loop for measuring impedance with a wearable device according to an embodiment;

FIG. 6C is a diagram depicting an exemplary short loop for measuring impedance with a wearable device according to an embodiment;

DETAILED DESCRIPTION

The following detailed description refers to the accompanying drawings. The same reference numbers in different drawings may be used to identify the same or similar elements.

A computing device may infer information regarding a user based on an impedance measurement of a circuit (also referred to herein as an "impedance loop" or a "loop") which includes a path traversing across the body of a user. The information may be sufficiently detailed so as to identify specific users, or the information may be less detailed so a user may be identified as belonging to a particular class (e.g., an adult or a child). The impedance measurement may be measured over a range of frequencies and over different paths across the user's body. Once an impedance value is determined for a particular loop (as will be explained in more detail below in reference to FIGS. 3A and 3B), the impedance value may be used in an evaluation process to find a match with a previously stored impedance value that is associated with a user profile. If a match is determined, the user profile may define access controls for the user of the computing device.

As used herein, a user profile may be defined as information associated with a user which may be used for authentication and/or access control. A user profile may contain various types of information which may identify a specific user and/or may associate the user with one or more classes which may be used for security purposes. For example, a user profile may be defined for a specific user and may associate the user with one or more classes. Such classes may be associated with access control, and could identify a specific user as an owner/administrator of a computing device, a standard user, or a guest. An owner/administrator, for example, may access all content and configuration options for a device. A standard user, for example, may have more restrictive access, and be limited in how a device may be configured. A guest, for example, may have limited access to content and no permissions to configure a device. In another example, a class may refer to the age of a user, and may classify the user as an adult or a child. In another embodiment, a user profile may not include information to specifically identify a user, but may define a user as belonging to one or more classes. For example, a user profile could include generic adult profiles or generic child profiles which may be used to control access to content and/or applications.

Figure 1:
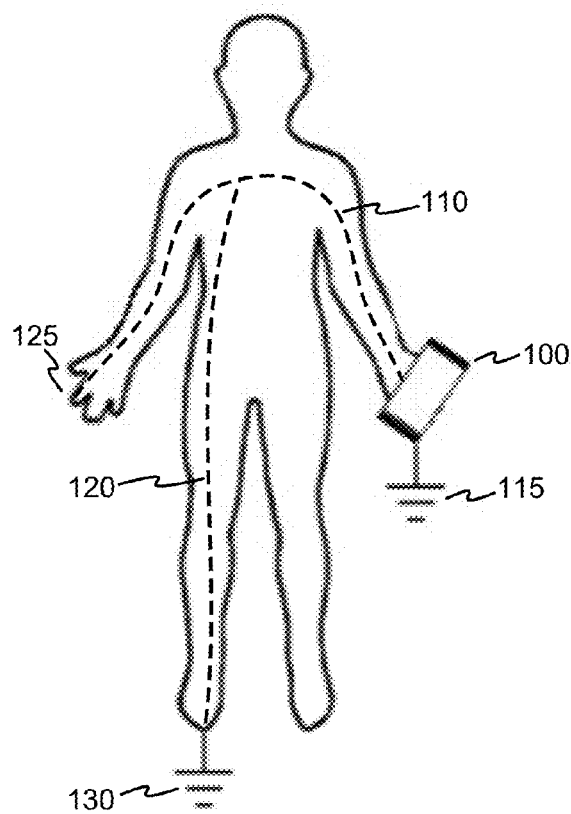
FIG. 1 is a diagram illustrating various paths through a body associated with impedance measurements having different grounds.

FIG. 1 is a diagram illustrating various paths through a body associated with conventional impedance measurements having different grounds. A conventional computing device 100 may perform impedance measurements in an attempt to ascertain information regarding the user. An impedance measurement may be made by establishing a current within an impedance loop, where a portion of the impedance loop traverses a path across the user's body. The circuit may be established by physically contacting the user at a first point on the body with a conductor that is energized with a low level signal. To establish a current for measuring impedance, another conductor would be in contact at a different point on the user's body to provide a return path for the current. The point providing the return path may be referred to as a "ground." In one example, a touchscreen display may serve as the energizing conductor which introduces the low level signal into a finger 125 of a free hand contacting the touchscreen display, while the opposite hand holding the device may be in contact with a ground connection. FIG. 1 shows the paths of different impedance loops when finger 125 of the free hand comes into contact with the touchscreen of conventional device 100. However, in order to more clearly illustrate the current paths through the body, the illustration in FIG. 1 does not show finger 125 contacting the touchscreen display of conventional computing device 100.

In conventional devices, variations in the impedance measurements can make it difficult to obtain impedance values accurate enough to characterize the user for authentication and/or access control purposes. Variations in impedance measurements may result, for example, from a variety of different paths that an impedance loop may take through the body when using conventional computing device 100 to measure impedance values. Such variations may result from the relative quality (i.e., the conductivity) of a particular path's connection to a ground. The locations of connections to ground relative to a user's body may vary considerably depending upon environmental conditions (e.g., the conductivity of different types of flooring), the footwear of the user (e.g., shoes having a rubber sole will insulate the ground connection), and/or the body conditions of the user (e.g., moisture levels of the fingers in contact with conventional computing device 100, hydration level of the body, etc.).

For example, as shown in FIG. 1, an impedance measurement made by conventional device 100 may use one loop which includes a path 120 between index finger 125 and first ground 130. Alternatively, the impedance measurement made by conventional device 100 may instead use a different loop, which may include a path 110 between index finger 125 and second ground 115. Conventional computing device 100 has no way to distinguish which paths (110 or 120) are used in generating a particular impedance measurement, which may vary considerably in impedance value to the extent where the measurements are unsuitable for authentication and/or access control.

Figure 2:
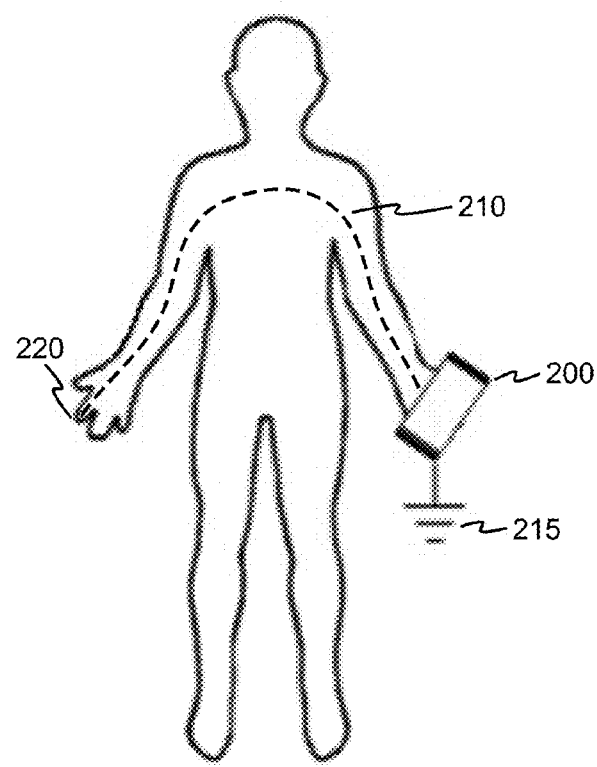
FIG. 2 is a diagram illustrating a path through a body for an impedance measurement having a unified ground associated with an exemplary computing device.

FIG. 2 is a diagram illustrating a path through a body for an impedance loop having a unified ground associated with an exemplary computing device 200. Computing device 200 may include circuitry which facilitates a "unified" or single ground 215, and thus effectively removes other grounds associated with the user's body (e.g., ground 130 shown in FIG. 1). Establishing a unified ground can prevent the problem of multiple impedance loops traversing through different paths as shown in FIG. 1. Restricting the number of impedance loops may improve the quality and consistency of impedance measurements to the extent where the accuracy is sufficient for identifying individual users. Moreover, as will be described in more detail below in relation to FIGS. 3A and 3B, unified ground 215 may also permit shorter loops which may result in more accurate impedance measurements, and thus provide more consistent matches to user profiles.

Further referring to FIG. 2, in one example, a touchscreen display of computing device 200 may serve as the energizing conductor which introduces the low level signal into a finger 220 of the free hand contacting the touchscreen display, while the opposite hand holding computing device 200 may be in contact with unified ground connection 215. FIG. 2 shows the path of a single impedance loop 210 when finger 220 of the free hand comes into contact with the touchscreen of computing device 200. In order to more clearly illustrate the current path 210 through the body, the illustration in FIG. 2 does not show finger 220 contacting the touchscreen display of computing device 200.

Figure 3A:
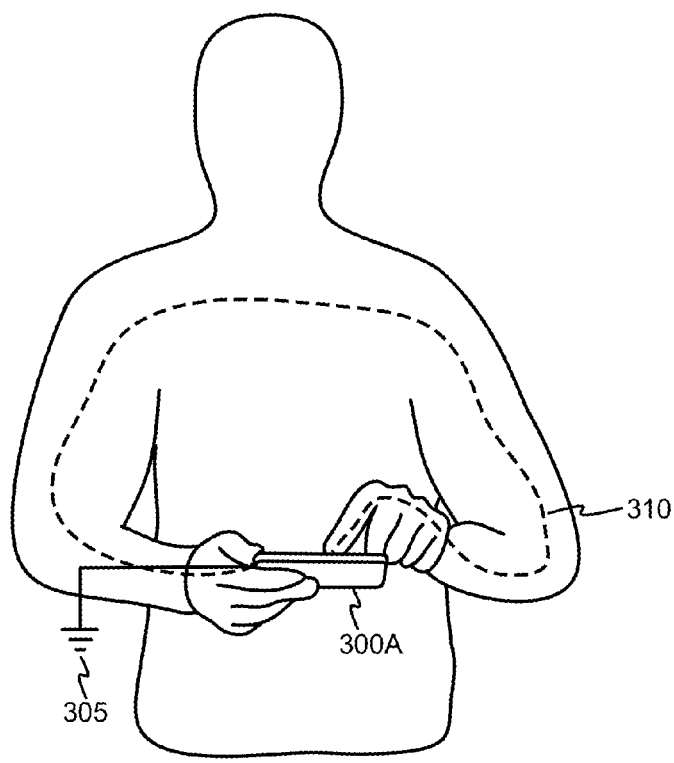
FIG. 3A is a diagram depicting an exemplary long loop for measuring impedance with a computing device consistent with an embodiment.
Figure 3B:
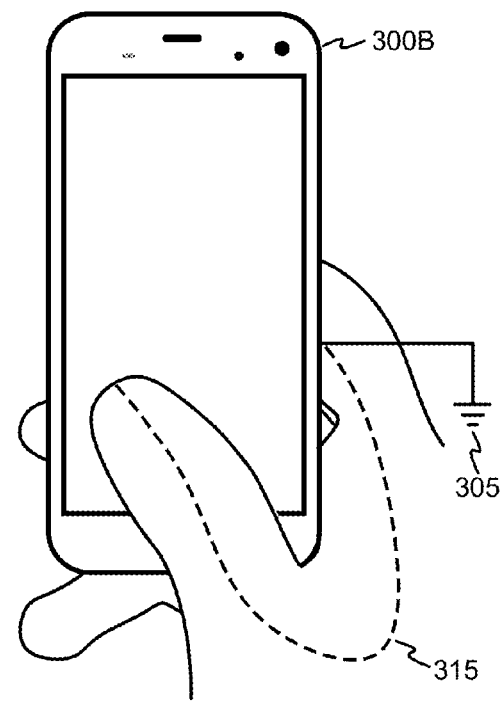
FIG. 3B is a diagram depicting an exemplary short loop for measuring impedance with a computing device consistent with an embodiment.

FIGS. 3A and 3B illustrate different classes of impedance loops that use different paths through the user's body to determine impedance measurements. FIG. 3A is a diagram depicting an exemplary long loop 310 for measuring an impedance value of the user using a computing device 300A, which may be tablet. Computing device 300A incorporates a unified ground 305. Long loop 310 may include a path traversing across the chest of the user, and may correspond to typical usage of computing device 300A where the user holds computing device 300 in one hand, and contacts a touchscreen of computing device 300A with the other hand. The long loop measurement is improved by the unified ground 305, as it provides a more consistent current path through the user's body to reduce variations and provide stable impedance measurements.

FIG. 3B is a diagram depicting an exemplary short loop 315 for measuring an impedance value of the user using a computing device 300B, which may be a smart phone. Short loop 315 may include a path traversing across a single hand of the user, and may correspond to typical usage of computing device 300B in which the user holds and operates computing device 300B with the same hand. In one example, the user may contact the touchscreen of computing device 300 with a thumb, and contact unified ground 305 with a finger. Unified ground 305 facilitates a reduced path traversing only through the single hand of the user, and thus may further improve the consistency and stability of the impedance measurement. While FIG. 3B only shows one configuration of the hand grasping computing device 300B, other hand configurations may be accommodated to perform short loop impedance measurements having different paths through the hand of the user. For example, instead of the thumb contacting the touchscreen of computing device 300B, single hand operation may also include the user contacting the touchscreen with an index finder, and holding computing device 300B using the thumb and middle finger of the same hand.

Figure 4:
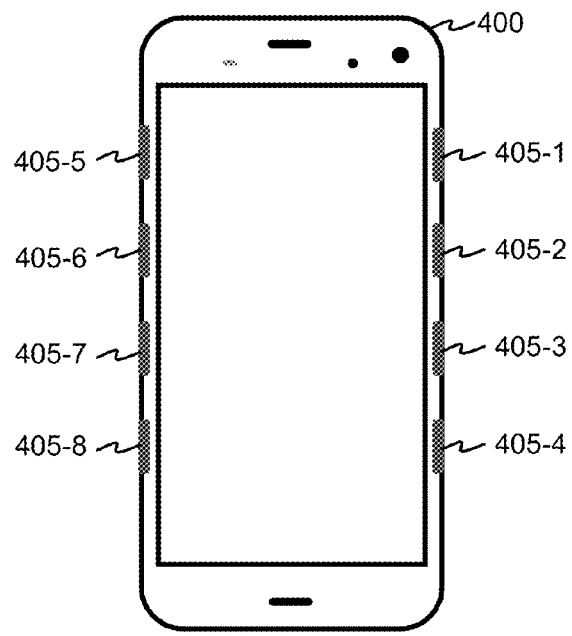
FIG. 4 is a diagram of an exemplary computing device having exposed ground electrodes.

FIG. 4 is a diagram of an exemplary computing device 400 having exposed ground electrodes 405-1, . . . , 405-8 (herein referred to plurally as "ground electrodes" 405 and individually as "ground electrode" 405-x, wherein x=1, . . . , N) (e.g., as shown FIG. 4, N may be eight). The ground electrodes 405 may provide a high quality (i.e., low impedance) connection to the ground of the impedance sensor, thus facilitating a unified ground. The ground electrodes may provide exposed conductors on the surface of computing device 400 in positions designed to promote contact with the user's hand. Additionally, increasing the number of electrodes may permit greater flexibility by increasing the number of hand grip positions which may be used for impedance measurements. While FIG. 4 shows eight ground electrodes 405 along the side of computing device 400, other embodiments may provide any number of additional or alternative ground electrodes at other locations on computing device 400. Other positions may include, for example, on the back, the top, and/or the bottom of computing device 400, to facilitate impedance measurements from different portions of the hand of the user.

While shortening the impedance loop may lower measurement variations for an individual user, the variance in impedance among different users may also be lowered, which can result in reduced security. In order to improve security for short loop measurements, additional authentication measures may be taken. For example, in addition to matching impedance for a user, computation device 400 may also request additional information from the user in order to complete authentication. For example, personal identification numbers (PINs) and or gestures (e.g., swipes) may be combined or used in conjunction with short loop impedance measurements to provide additional security for operations and/or transactions having higher risk (e.g., banking, credit payments, purchases, and/or signing documents). Other so-called "two factor" or "two step" techniques may be used to combine additional information and/or characteristics which are unique to the user. In some embodiments, obtaining the additional information may not require an active step on the part of the user (e.g., may not actively require, for example, reading a fingerprint of a user in addition to determine an impedance measurement, where the fingerprint reading and the impedance measuring may be performed (substantially) at the same time.

In another embodiment, security may be increased by performing multiple short loop measurements of the user using a plurality of electrodes 405. For example, four electrodes on each side of computing device 400 (e.g., 405-1 through 405-4 and 405-5 through 405-8) may permit distinct short loop impedance measurements from different fingers. Various embodiments may arrange the measurements in different ways. For example, all ground electrodes 405 may be made at the same time. Alternatively, the electrodes 405 may be swept and/or contacted in a particular pattern (e.g., from top to down, bottom to top, even electrodes, odd electrodes, etc.). Alternatively, all fingers do not need to touch an electrode, where in such a case, the impedance will measure as a high value. This pattern may be used as a unique factor (e.g., like a "secret key") for a particular user, and be used to improve security. Alternatively or additionally, a factor may include how many ground electrodes 405 should be associated with a thumb or palm side of the hand grip.

In another embodiment, the user may designate a number of electrodes 405 in a particular sequence known only to the user, which may act as a security gesture. The display of computing device 400 may react in an accepting manner when an expected measurement at a particular electrode is received, or may react in a rejecting manner if an expected measurement is not received or sequence not properly entered.

In another embodiment, particular signal electrodes may be graphically designated on the touchscreen of computing device 400. The touchscreen may present different zones which are to be touched in a particular manner (specific finger) and/or sequence to authenticate the user.

Figure 5:
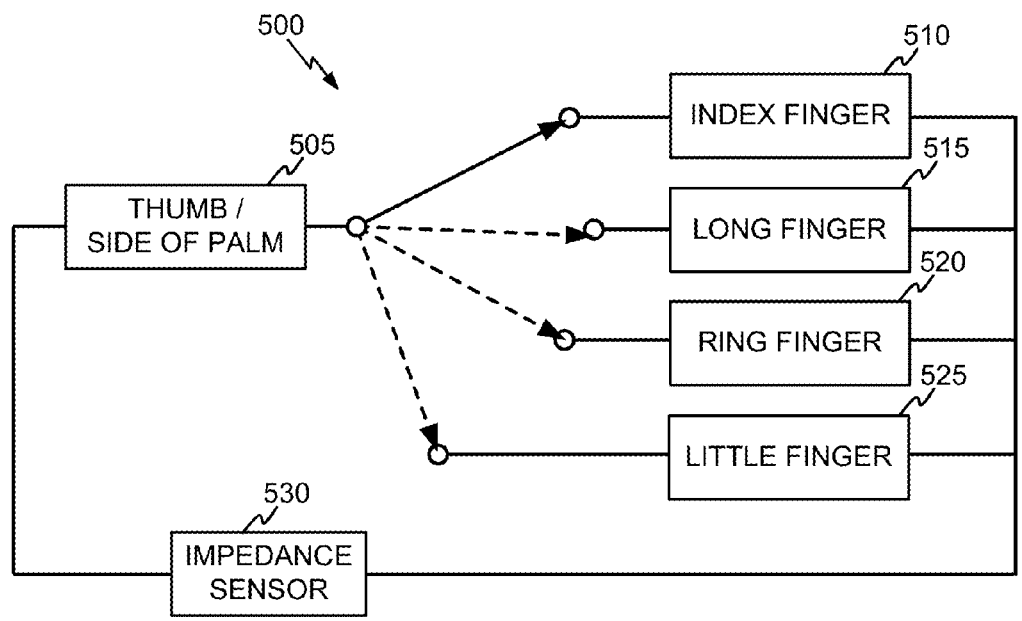
FIG. 5 is a block diagram of an exemplary multiplexer for switching between the ground electrodes shown in FIG. 4.

FIG. 5 is a block diagram of an exemplary multiplexer 500 for switching between particular configurations of ground electrodes 405. The computation device may designate different ground electrodes associated with different parts of a particular user's hand, and use multiplexer 500 to sequence between them. Embodiments may employ different circuits or logic (in software) to include different various combinations and permutations of measurements. For example, as shown in FIG. 5, multiplexer 500 may scan through an index finger electrode 510, a long (i.e., "middle") finger electrode 515, a ring finger electrode 520, and little finger electrode 525 in the sequence as illustrated. Additionally, each electrode sampled by the multiplexer 500 may be measured by impedance sensor 530 in series with a thumb/side of palm electrode 505.

FIGS. 6A-6C are diagrams of an exemplary wearable device 600 that can determine impedance measurements of a user. As shown in FIG. 6A, wearable device 600 may include a display 605, signal electrodes 610-1, . . . , 610-2 (herein referred to plurally as "signal electrodes" 610 and individually as "signal electrode" 610-x, wherein x=1, . . . , N) (e.g., as shown in FIG. 6A, N may be two), a ground electrode 615, and a combination electrode 620.

In some embodiments, wearable device 600 may be a fully functional computing device including a touchscreen for display 605, personal area networking (PAN) capability (e.g., Bluetooth LE), local area networking (LAN) capability (e.g. WiFi), and/or wide area network (WAN) capability (including WiMAXX and/or cellular communication functionality). In other embodiments, wearable device 600 may be a wearable accessory acting in conjunction with a computing device, include PAN networking capability, and may further include a non-touchscreen display 605, or a display having limited functionality (e.g., limited resolution, colors, and/or only capable of displaying numbers and/or characters). Alternatively, the wearable accessory may have no display at all, or merely include an analog watch face.

In an embodiment, the impedance values measured by wearable device 600 may be transmitted to a user's separate computing device (e.g., 300B) to authenticate and provide access control for the separate computing device. The impedance value may be transmitted using any personal area network (e.g., Bluetooth LE) or a local area network (e.g., WiFi). In another embodiment, wherein wearable device 600 is a computing device, the measured impedance values be used internally for authentication and/or access control to wearable device 600.

Electrodes 610, 615, and 620 may be used for generating various impedance measurements of a user. In the example shown in FIG. 6A, signal electrodes 610 may apply a low level signal for long loop impedance measurements. Ground electrode 615 may be used for both long loop and short loop impedance measurements. Combination electrode 620 may be used for short loop impedance measurements, and be used as a signal electrode or a ground electrode, as described in more detail below. In another embodiment, in which display 605 is a touchscreen display, the touchscreen may act as a signal electrode for determining either long loop or short loop impedance measurements. In other embodiments, the roles of electrodes 610, 615, and 620 may be reversed (e.g., signal/ground) and still be capable of performing both long loop and short loop impedance measurements.

FIG. 6B is a diagram depicting an exemplary long loop for measuring impedance with wearable device 600. Signal electrodes 610 (not shown in FIG. 6B) may provide low level signals which are applied to the strapped wrist of the user. The user may touch ground electrode 615 (or combination electrode 620 when acting as a ground electrode) to create a long loop which includes a current traversing a path 625 across the chest of the user. An impedance sensor within wearable device 600 may measure an impedance value based on the long loop. In other embodiments, display 605 may serve as a signal electrode which may be used for long loop impedance measurements, where signal electrodes 610 are switched to serve as ground electrodes.

FIG. 6C is a diagram depicting an exemplary short loop for measuring impedance with wearable device 600. Combination electrode 620 may serve as a signal electrode to transmit signals to a finger an unstrapped hand 635 of the user. The user may touch both combination electrode 620 and ground electrode 615, for example, as shown in FIG. 6C, to create a short loop which includes a current traversing a path 630 across unstrapped hand 635. An impedance sensor within wearable device 600 may measure an impedance value based on the short loop. In other embodiments, display 605 may serve as a signal electrode which may be used to generate short loop impedance measurements.

Figure 7:
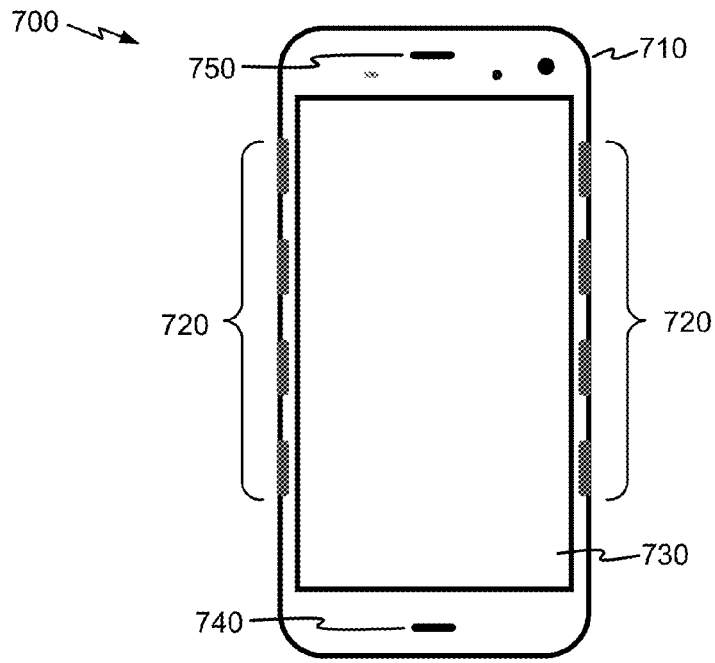
FIG. 7 is a diagram illustrating an exemplary computing device.

FIG. 7 is a block diagram illustrating an exemplary computing device 700. A computing device may include a device with a display, such as a mobile phone, a smart phone, a smart watch, a phablet device, a tablet computer, a laptop computer, a personal computer, a personal digital assistant (PDA), a wearable computer, a media playing device, and/or another type of portable communication device. For example, computing device 700 may include a housing 710 having exposed ground and/or combination electrodes 720, a display 730, a microphone 740, and a speaker 750. Housing 710 may enclose computing device 700, provide fixture points for electrodes 720, and protect internal components from the outside environment.

Display 730 may include a liquid crystal display (LCD), an electronic ink display (e.g., an electrophoretic display), an electroluminescent display, and/or another type of display device. Display 730 may be a touchscreen and thus include devices/components configured to detect a user's touch, which may further include a set of touch sensors, such as a set of capacitive sensors (e.g., surface capacitive sensors, projected capacitive touch sensors, etc.), a set of resistive sensors (e.g., analog resistive sensors, digital resistive sensors, etc.), a set of optical sensors, etc. Additionally, display 730 may also serve as a signal electrode for impedance measurements, and include components for providing a low level signal and for interfacing with an impedance sensor. When device 700 does not use a touchscreen display as a signal electrode, at least one distinct signal electrode, or combination electrode, may be fixed in housing 710 to provide a low level signal for impedance measurements.

Microphone 740 may function as an input device that receives audio signals and converts the received audio signals to electrical signals. Speaker 750 may function as an output device that receives electrical signals and generates audio signals based on the received electrical signals. Computing device 700 may further include additional sensors that are not shown in FIG. 7. Although FIG. 7 shows exemplary components of computing device 700, in other implementations, computing device 700 may include fewer components, different components, differently arranged components, or additional components than depicted in FIG. 7. Additionally or alternatively, one or more components of computing device 700 may perform functions described as being performed by one or more other components of computing device 700.

Figure 8:
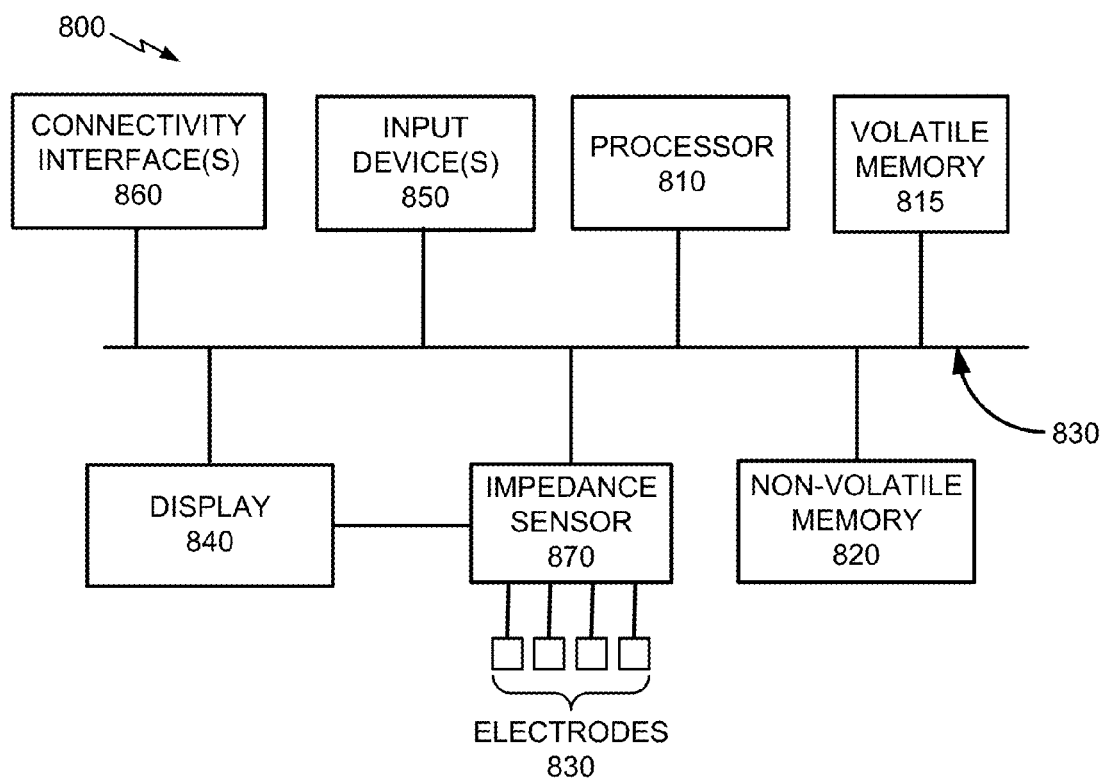
FIG. 8 is a block diagram illustrating exemplary components of a computing device.

FIG. 8 is a block diagram illustrating exemplary components of a computing device 800, which may correspond to any of the devices 200, 300, 400, 600 (in some embodiments) and 700. As shown in FIG. 8, computing device 800 may include a processor 810, volatile memory 815, non-volatile memory 820, bus 830, display 840, input device(s) 850, connectivity interface(s) 860, and impedance sensor 870.

Processor 810 may include a processor, microprocessor, or processing logic that may interpret and execute instructions. Volatile memory 815 may include a random access memory (RAM) or another type of dynamic storage device that may store information and instructions for execution by processor 810. Non-volatile memory 820 may include a Flash RAM device, a Read Only Memory (ROM) device or another type of static storage that may store information and instructions for use by processor 810. Non-volatile memory 820 may further store user profiles and associated impedance values corresponding to users of computing device 800.

Display 840 may include a liquid crystal display (LCD), an electronic ink display (e.g., an electrophoretic display), an electroluminescent display, an Organic Light Emitting Diode (OLED) display, and/or another type of display device. Display 840 may be a touchscreen and thus include devices/components configured to detect a user's touch, which may further include a set of touch sensors, such as a set of capacitive sensors (e.g., surface capacitive sensors, projected capacitive touch sensors, etc.), a set of resistive sensors (e.g., analog resistive sensors, digital resistive sensors, etc.), a set of optical sensors, etc. Additionally, display 840 may also serve as a signal electrode for impedance measurements, and include components for providing a low level signal and for interfacing with an impedance sensor.

Input device(s) 850 may include one or more mechanisms that permit an operator to input information to computing device 600, such as, for example, a keypad or a keyboard, a microphone 730, voice recognition, components for a touchscreen, and/or biometric mechanisms, etc.

Connectivity interface(s) 860 may include any transceiver mechanism that enables computing device 800 to communicate with other devices and/or systems. For example, connectivity interface(s) 860 may include mechanisms for communicating with another device or system via a network, such as cellular network (e.g., Long Term Evolution (LTE), LTE Advanced, etc.). Connectivity interface(s) 860 may include a transceiver that enables computing device 800 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Connectivity interface(s) 860 may include a transmitter that converts baseband signals to radio frequency (RF) signals and/or a receiver that converts RF signals to baseband signals. Connectivity interface(s) 860 may be coupled to an antenna assembly (not shown) for transmitting and receiving RF signals.

Connectivity interface(s) 860 may further include a logical component that includes input and/or output ports, input and/or output systems, and/or other input and output components that facilitate the transmission of data to other devices. For example, connectivity interface(s) 870 may include a network interface card (e.g., Ethernet circuitry) for wired communications and/or a wireless network interface (e.g., a WiFi) card for wireless communications. Connectivity interface(s) 860 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Impedance sensor 870 may include one or more devices used to measure the impedance of a user by initially creating impedance loops (i.e., circuits) that include paths within the human body. The impedance loops may be created by applying ground and signal electrodes 830 to different parts of the body, where the signal electrode applies an excitation signal and the ground electrode provides a return for the signal current. Once an impedance loop is established, impedance sensor 870 may measure parameters of the excitation signal passing through the body to determine, for example, a capacitance value. Impedance sensor 870 may use a frequency swept signal for the excitation signal, and be able to measure capacitances on the order of fractions of a pico-Farad. Different impedance loops can be created based on the applying electrodes to the human body to create a circuit using a low level signal for excitation. As shown in FIG. 8, impedance sensor 870 may directly interface to display 840 which may act as signal electrode. Impedance sensor 870 may also interface to processor 810 over bus 830 to provide impedance values for further processing (e.g., statistical processing such averaging) and for storage in non-volatile memory 820 for association with user profiles.

Computing device 800 may perform certain operations or processes, as may be described in detail below in relation to FIGS. 10 and 11. Computing device 800 may perform these operations in response to processor 810 executing software instructions contained in a computer-readable medium, such as volatile memory 815 and/or non-volatile memory 820. A computer-readable medium may be defined as a physical or logical memory device. A logical memory device may include memory space within a single physical memory device or spread across multiple physical memory devices. The software instructions may be read into volatile memory 815 from another computer-readable medium, such as non-volatile memory 820, or from another device via connectivity interface(s) 860. The software instructions contained in volatile memory 815 and/or non-volatile memory 820 may cause processor 810 to perform operations or processes described below. Alternatively, hardwired circuitry, such as, for example, application specific integrated circuits (ASICs) and/or field programmable gate arrays FPGAs may be used in place of or in combination with software instructions to implement processes consistent with the principles of the embodiments. Thus, exemplary implementations are not limited to any specific combination of hardware circuitry and software.

The configuration of components of computing device 800 illustrated in FIG. 8 is for illustrative purposes only. It should be understood that other configurations may be implemented. Therefore, computing device 800 may include additional, fewer and/or different components than those depicted.

Figure 9:
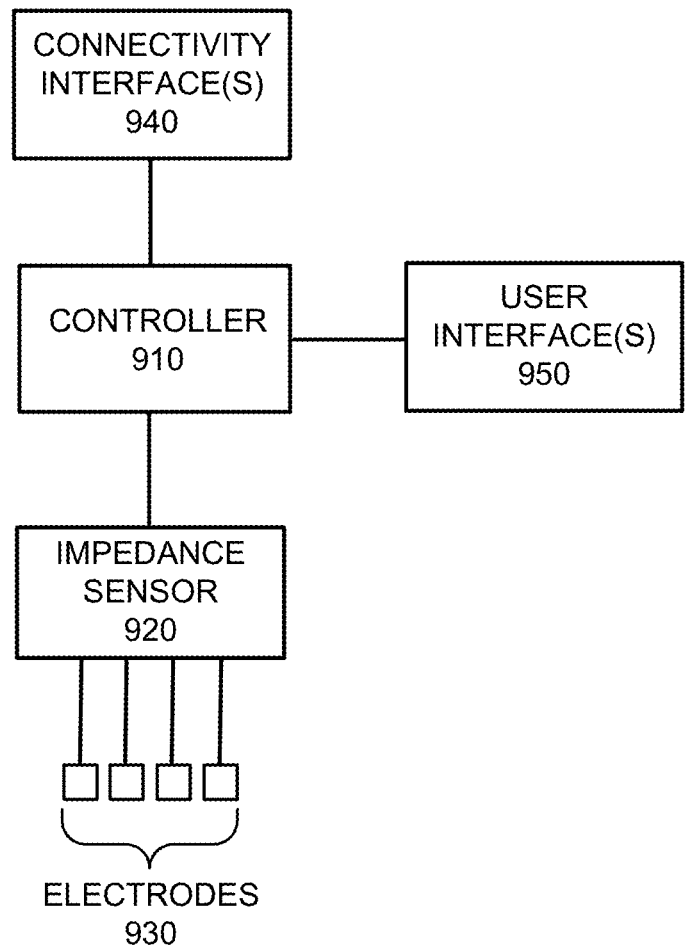
FIG. 9 is a block diagram illustrating exemplary components for an embodiment of a complementary wearable device that may serve as an accessory to another device.

FIG. 9 is a block diagram illustrating exemplary components for an embodiment of a wearable device 900 which may serve as an accessory to a computing device. Wearable device 900 may include a controller 910, an impedance sensor 920, electrodes 930, connectivity interface(s) 940, and user interface(s) 950. Wearable device 900 may be used to measure impedance values of a user, as shown in FIGS. 6B and 6C, and provide the measured impedance values to a computing device for authentication and/or access control. In another embodiment, wearable device 900 may also perform authentication by determining whether the measured impedance value corresponds to a stored impedance value(s) associated with a user profile, and transmit an indication to another device as to whether a positive authentication was determined. The computing device may have impedance measuring capability as described in relation to FIG. 8, and be used as wrist accessory for the sake of convenience. Alternatively, wearable device 900 may work in conjunction with a computing device that does not have the capability to measure impedance values of a user, and thus may provide this additional functionality for authentication and/or access control purposes. In alternative embodiments, wearable device 900 may include a watch, a wristlet, a ring, or other device worn on the body of a user. In other embodiments, wearable device 900 may be placed on the head of a user, and may include a virtual reality and/or augmented reality device that may be realized within a visor, glasses, and/or some other form of headset. For various embodiments, the locations on the body used for measuring impedance values can vary depending upon what form wearable device 900 takes and how it interacts with the user. For example, contact points which include the ear and/or the head may be used to establish an impedance loop for wearable device 900 when embodied as a visor and/or a headset. Additionally or alternatively, wearable device 900 may establish an impedance loop which includes one or more fingers, a part of an arm, a full hand, and/or any other suitable contact points on the body of the user.

Controller 910 may include a processor, microprocessor, or processing logic that may interpret and execute instructions. Controller may further include any type of "on-board" volatile memory and/or non-volatile memory that may store information and instructions for use by the processor of controller 910. Such instructions may be used to facilitate impedance measurements of a user, and transfer them to the computing device. Alternatively or additionally, controller 910 may employ hardwired circuitry, such as, for example, application specific integrated circuits (ASICs) and/or field programmable gate arrays FPGAs, which may be used in place of or in combination with software instructions to implement processes consistent with the principles of the embodiments. Thus, exemplary implementations are not limited to any specific combination of hardware circuitry and software. Wearable controller 910 may further include volatile or non-volatile memory external to controller 910 (not shown). In some embodiments where device 900 may perform authentication based on measured impedance values, memory on-board controller 910 may store user profiles and impedance values associated therewith for performing user authentication.

Connectivity interface(s) 940 may include hardware and/or software that enables wearable device 900 to communicate with any computing device. Typically, the computing device may be in the presence of the user, so connectivity interface(s) 940 may include hardware and/or software for communicating over a personal area network (PAN) (e.g., Bluetooth LE). Alternatively, other systems may be included for communication over other types of networks, such as, for example, local area networks (e.g. WiFi) and/or wide area networks (e.g., cellular networking such as LTE).

In an embodiment, wearable device 900 may include user interface(s) 950. The user interface(s) 950 may include various transducers to provide feedback to the user regarding the status of authentication. For example, audio and/or tactile transducers may provide a signal indication the status of authentication (e.g., whether positive authentication occurred or failed). Additionally or alternatively, wearable device 900 may further include an image display consistent with wearable devices (which may further include touchscreen capability), or a display having limited functionality (e.g., limited resolution, colors, and/or only capable of displaying numbers and/or characters). In such cases, the display may also provide an indication of the status of authentication.

Impedance sensor 920 may be used to measure the impedance of a user by initially creating impedance loops (i.e., circuits) that include paths within the human body. The impedance loops may be created by applying ground and signal electrodes 930 to different parts of the body, where the signal electrode applies an excitation signal and the ground electrode provides a return for the signal current. Once an impedance loop is established, impedance sensor 920 may measure parameters of the excitation signal passing through the body to determine, for example, a capacitance value. Impedance sensor 920 may use a frequency swept signal for the excitation signal, and be able to measure capacitances on the order of fractions of a pico-Farad. Wearable device 900 may create impedance loops having different paths, such as, for example a long loop having path 625 shown in FIG. 6B, or a short loop having path 630 shown in FIG. 6C, that can be created based on the applying electrodes 930 to the human body.

The configuration of components of wearable device 900 illustrated in FIG. 9 is for illustrative purposes only. It should be understood that other configurations may be implemented, thus wearable device 900 may include additional, fewer and/or different components than those depicted.

Figure 10:
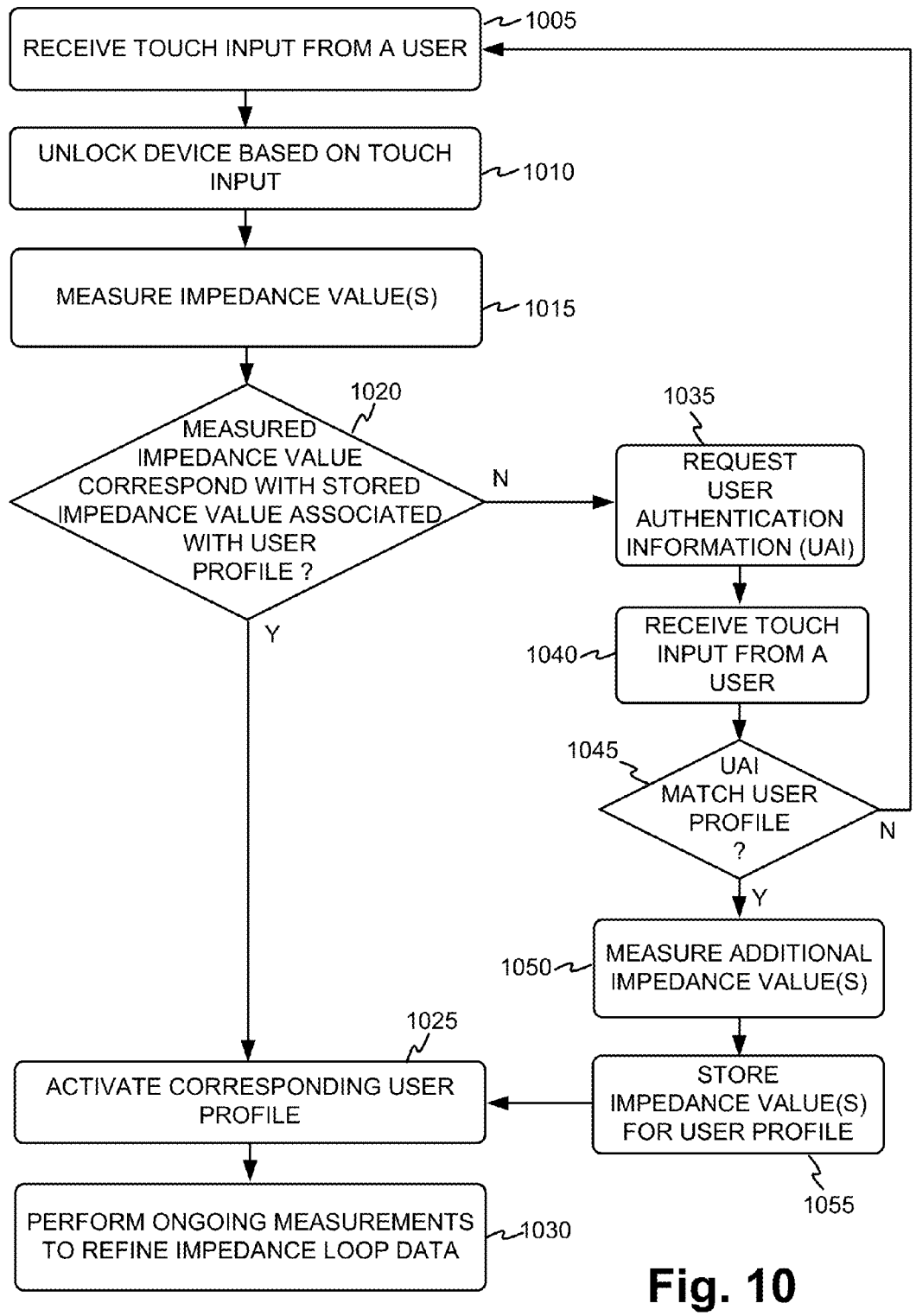
FIG. 10 is a flowchart of an exemplary process for access control authenticating based on an impedance measurement.

FIG. 10 is a flowchart of an exemplary process 1000 for access control authentication based on an impedance measurement. Process 1000 shown in FIG. 10, and/or variations thereof, may be performed by computing device 800 and/or wearable device 900. In an embodiment, computing device 800 may initially receive, on a touchscreen display surface, a touch input from the user (Block 1005). The touch input which is received may include receiving a personal identification number (PIN) entry, a tap, a swipe gesture, and/or a path defined by a gesture. In one embodiment, computing device 800 may unlock itself based on the received touch input (Block 1010). For example, if a PIN entry corresponds to a predetermined pin associated with a user of computing device 800, the computing device may be unlocked.

Computing device 800 may measure an impedance value based on the received touch input (Block 1015). The impedance measurement may be associated with a long loop which includes a path traversing across a chest of the user, and further include a first long loop termination point on a first hand in contact with the touchscreen display surface of computing device 800, and a second long loop termination point on a second hand in contact with the ground electrode(s) of computing device 800 (e.g., ground 215). Alternatively, the impedance measurement may be associated with a short loop which includes a path traversing across the first hand of the user, and further includes a first short loop termination point on the first hand in contact with the touchscreen display surface of computing device 800, and a second short loop termination point on the first hand in contact with the ground electrode(s) of computing device 800 (e.g., ground 305).

In another embodiment, computing device 800 may combine the measured impedance value associated with the short loop with at least one of a PIN or a gesture associated with the touchscreen display surface. For example, the unlocking sequence may depend on both a proper PIN entry in conjunction with a matching impedance value of the user associated with the PIN. Additionally, measuring the impedance value may further include measuring additional impedance values associated with a plurality of loops, where at least one of the plurality of loops traverses along a distinct path of a body of the user. For example, to improve security, the computing device may measure an impedance of one short loop, and then measure the impedance of one long loop for performing authentication.

Once the impedance value(s) is determined, computing device 800 may determine whether the measured impedance value corresponds to at least one stored impedance value associated with a user profile (Block 1020). If the measured impedance value corresponds to at an impedance value associated with the user profile (i.e., user authentication has occurred), computing device 800 or wearable device 900 may provide a positive indication to the user, where the indication may include an audio signal, a tactile signal, haptic feedback, and/or a visual indicator if applicable (e.g., when wearable device 900 includes a display).

In one embodiment, once the measured impedance value is determined to correspond to an impedance value(s), computing device 800/wearable device 900 may transmit to a second device an indication that the user has been positively identified (e.g., authenticated). This signal may be provided to any networked device, which may, upon receiving the indication of authentication, perform an action based upon the authenticated user. Such actions may be based on a profile stored in the networked device, and/or may be provide over a network (e.g., from a cloud server). The networked device may include, for example, a monitor (e.g., a television), a projector, an audio device, a home appliance, lighting devices (e.g., lamps, strip lights, etc.), a Heating Ventilation Air Conditioning (HVAC) controller, a physical security device (e.g., lock, door, window, garage door, etc.), a desktop or laptop computer, and/or any networked device (e.g., an "Internet of Things" device). The actions may generic (e.g., power "on"/"off" and/or specific to the networked device. For example, the actions may include changing a television channel, unlocking a door, altering the HVAC temperature, turning on a light, etc. In some cases, the action may be to compete a financial transaction or other transaction via a networked device. For example, once the user has authenticated, computing device 800/wearable device 900 may complete a purchase at a retailer or merchant.

In another embodiment, computing device 800 may activate the user profile (Block 1025) upon authentication in Block 1020. Thus, computing device 800 may activate a user profile which includes a security classification, where, for example, the security classification further includes an owner profile, a standard user profile, or a guest profile. In another embodiment, computing device 800 may activate a user profile associated with a specific individual. In yet another embodiment, computing device may activate a user profile which includes an age classification, wherein the age classification further includes an adult profile or a child profile. The user profile may automatically enable or disable functionality of computing device 800 and/or access to applications, settings, etc.

In an embodiment, computing device 800 may present a user interface on the touchscreen display based upon the activated user profile. Thus, aspects of the user interface may change indicating access status of the activated profile. For example, certain controls on a user interface may change depending upon the access status of the activated profile. Thus, if a user does not have access to certain controls, graphics elements corresponding to those controls may be 'grayed out' or not displayed at all.

In an embodiment, the user profiles may be created and refined using, for example, machine learning, where access to particular applications and/or data type usage may be classified by computing device 800. For example, classifications between an adult and a child may be determined though usage patterns of computing device 800. Such general classifications may not require specific identification of an individual, and thus may be determined using wider tolerances of impedance measurement. Moreover, the wider tolerances may facilitate discriminating the general impedance difference between an adult and a child, given large differences in body mass index (BMI).

In an embodiment, once the user profile is activated, different items in the user interface of computing device 800 may be assigned to different impedance profiles so that such user interface items may not be accessed or activated if the item does not correspond to the activated user profile. For example, pressing certain software defined "buttons" in an application for purchasing an item may only be activated by an adult, or more specifically, by the owner of computing device 800. Such embodiments, for example, may use an application programming interface (API) that communicates with a service provider so that a corresponding website can tag certain links as active or inactive, depending upon the profile. This may be realized by either a) having an option that is visible, but only let a specific user's impedance profile activate it, or b) let the same graphic control go to different options based on the corresponding profile of the user who touches that graphical control. For example, a movie selection button may only display age appropriate movies upon activation by a child, but may display recommendations appropriate for adults when activated by a user having an adult profile.

Upon activating the user profile corresponding to the measured impedance value in Block 1025, computing device 800 may perform ongoing impedance value measurements based on the additional touch input to refine the at least one stored impedance value associated with the activated user profile (Block 1030). For example, impedance values for profiles may be built up over time based upon computing device 800 usage. For example, application usage between children and adults may be safely assumed and profiled. When a user interacts with applications profiled for adults (e.g., calendaring applications, email usage with specific accounts, specific websites, etc.), each tap and swipe on the touchscreen of computing device 800 may be stored to refine the impedance values associated with the user's profile. When refining the impedance value measurements in Block 1030, user interface gestures which involve drag events may be of special interest, as such gestures may be associated with sustained finger contact with the touchscreen display of computing device 800, which can be used for additional impedance measurements.

Further referring to FIG. 10, when in response to determining the measured impedance value fails to correspond to any stored impedance value associated with the user profile in Block 1020, computing device 800 may request user authentication credentials from the user (Block 1035). In response to the request, computing device 800 may receive, from an additional touch input by the user, user authentication information (UAI) through the touchscreen display surface of the device (Block 1040). The UAI may include PINs, passwords, and/or authentication gestures. Computing device 800 may determine whether the UAI matches the user profile (Block 1045). If so, computing device 800 may measure an additional impedance value based on the additional touch input (Block 1050), and store the additional impedance value for the user's profile matching the UAI (Block 1055). Afterword, control may be transferred to Block 1025 to activate the corresponding user profile. If in Block 1045 computing device 800 determines the received UAI fails to match the user profile, then control may be transferred back to Block 1005 to receive additional touch input from the user.

Figure 11:
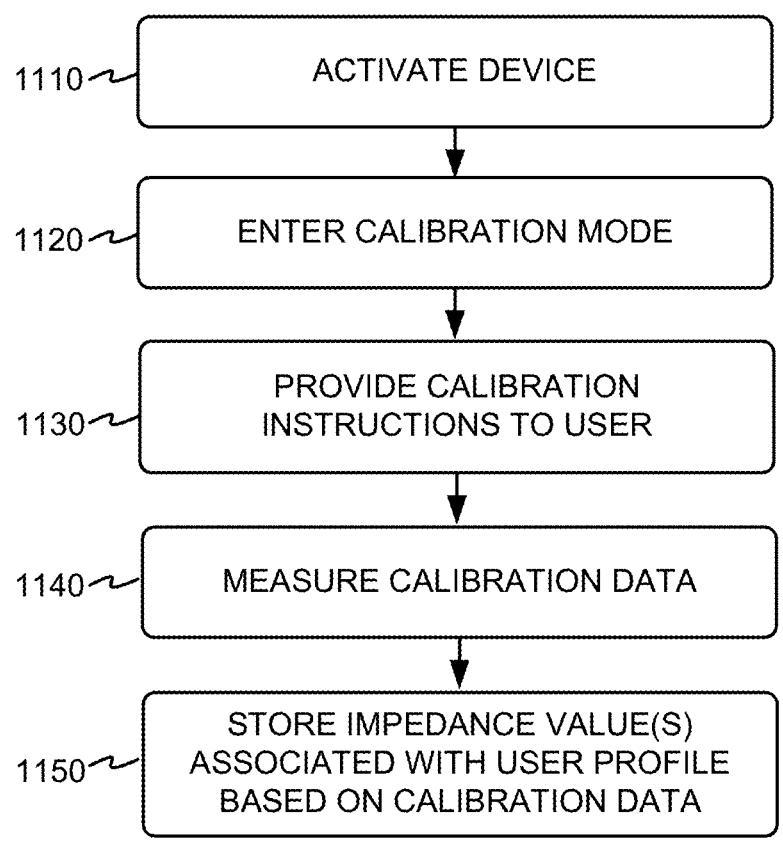
FIG. 11 is a flowchart of an exemplary process for calibrating a computing device for impedance based access control authentication.

FIG. 11 is a flowchart of an exemplary process 1100 for calibrating a computing device for impedance based access control authentication. Calibration facilitates accurate discrimination among users based upon measured impedance values. Calibration may be performed by having the user placing an appropriate finger on the touchscreen display so computing device may perform the impedance measurement(s) and store the measured impedance values in memory. The impedance values may vary depending upon which part of the hand (e.g., which finger, what part of the palm, etc.) is used for the measurement. During a calibration procedure, computing device 800 may specify what type of touch(es) should be performed during a calibration procedure. For good results, the user should calibrate the impedance measurements holding computing device 800 as will be done during use when authentication and/or other security functions are performed.

In an embodiment, computing device 800 may calibrate the impedance measurement upon activation (Block 1110). Computing device 800 may then enter a calibration mode (Block 1120). Computing device 800 may provide calibration instructions to the user (Block 1130). This may be performed by indicating how to hold the device, which electrodes to use (e.g., using short loops vs long loops), and/or which gestures to perform when collecting calibration measurements. Computing device 800 may then measure the calibration data (Block 1140), and store the measured impedance value(s) associated with the user profile based on the calibration data (Block 1150).

In the preceding specification, various implementations have been described with reference to the accompanying drawings. It will, however, be evident that various modifications and changes may be made thereto, and additional implementations may be provided, without departing from the broader scope of the invention as set forth in the claims that follow. The specification and drawings are accordingly to be regarded in an illustrative rather than restrictive sense.

For example, while series of blocks have been described with respect to FIGS. 10 and 11, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to realize these systems and methods is not limiting of the exemplary implementations. Thus, the operation and behavior of the devices and methods were described without reference to the specific software code, whereas it is understood that software and control hardware can be designed to implement the devices and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

The terms "comprises"/"comprising" when used in this specification are taken to specify the presence of stated features, integers, steps or components but does not preclude the presence or addition of one or more other features, integers, steps, components or groups thereof. Further, the term "exemplary" (e.g., "exemplary implementation," "exemplary configuration," etc.) means "as an example" and does not mean "preferred," "best," or likewise.

No element, act, or instruction used in the present application should be construed as critical or essential to the exemplary implementations unless explicitly described as such. Also, as used herein, the article "a" is intended to include one or more items. Further, the phrase "based on" is intended to mean "based, at least in part, on" unless explicitly stated otherwise.

What is claimed is:

1. A method for authenticating a user for access control, comprising:
   receiving a touch input from a user;
   measuring an impedance value based on the touch input; and
   determining whether the measured impedance value corresponds to at least one stored impedance value associated with a user profile; and
   wherein in response to determining that the measured impedance value fails to correspond to any stored impedance value associated with the user profile, further comprising:
      requesting user authentication credentials from the user;
      receiving, from an additional touch input by the user, user authentication information through the touchscreen display;
      determining the user authentication credentials matches the user profile;
      measuring an additional impedance value based on the additional touch input;
      storing the additional impedance value for the user's profile matching the authentication information; and
      activating the user profile matching the user authentication information.

2. The method of claim 1, further comprising:
   providing an indication to the user upon determining the measured impedance value corresponds to at least one impedance value associated with the user profile, wherein the indication is at least one of an audio signal, a tactile signal, or a visual signal.

3. The method of claim 1, wherein upon determining the measured impedance value corresponds to at least one impedance value associated with the user profile, further comprising:
   transmitting to a second device an indication of a positive user identification.

4. The method of claim 1, wherein the touch input is received on a surface of a touchscreen display, further comprising:
   unlocking a device based on the touch input; and
   activating the user profile in response to determining that the measured impedance value corresponds to at least one stored impedance value associated with the user profile.

5. The method of claim 4, wherein the receiving the touch input comprises:
   receiving at least one of a personal identification number (PIN) entry, a tap, a swipe gesture, or a path defined by a gesture.

6. The method of claim 4, wherein activating the user profile further comprises:
   activating the user profile which includes a security classification, wherein the security classification further includes an owner profile, a standard user profile, or a guest profile.

7. The method of claim 6, wherein activating the user profile further comprises:
   activating the user profile associated with a specific individual.

8. The method of claim 4, wherein activating the user profile further comprises:
   activating the user profile which includes an age classification, wherein the age classification further includes an adult profile or a child profile.

9. The method of claim 4, further comprising:
   presenting a user interface on the touchscreen display based upon the activated user profile.

10. The method of claim 1, further comprising:
    receiving additional touch inputs from the user; and
    performing ongoing impedance value measurements based on the additional touch input to refine the at least one stored impedance value associated with the user profile.

11. The method of claim 1, wherein the measuring the impedance value comprises at least one of:
    measuring the impedance value associated with a first loop which includes a path traversing a chest of the user and that travels from a contact point of a first hand of the user with a touchscreen display surface of a device to a contact point of a second hand of the user with at least one ground electrode of the device, or
    measuring the impedance value associated with a second loop which includes a path traversing the first hand of the user and that travels from a contact point of the first hand with the touchscreen display surface of the device to a contact point of the first hand with the at least one ground electrode of the device.

12. The method of claim 11, wherein measuring the impedance value further comprises:
    using the measured impedance value associated with the second loop with at least one of a personal identification number (PIN) or a gesture associated with a touchscreen display surface.

13. The method of claim 1, wherein the measuring the impedance value further comprises:
measuring additional impedance values associated with a plurality of loops, wherein at least one of the plurality of loops traverses a distinct path of a body of the user.

14. The method of claim 1, further comprising:
activating a device;
entering a calibration mode;
providing calibration instructions to the user;
measuring calibration data; and
storing at least one impedance value associated with the user profile based on the measured calibration data.

15. A computing device, comprising:
at least one ground electrode configured for contact with a user;
an impedance sensor coupled to the least one ground electrode, wherein the impedance sensor is configured to perform a measurement based on a touch input from the user;
a memory which stores instructions; and
a processor, coupled the impedance sensor and the memory, wherein the processor is configured to execute the instructions causing the processor to:
receive the touch input from the user,
receive an impedance value based on the touch input measured by the impedance sensor, and
determine whether the received impedance value corresponds to at least one stored impedance value associated with a user profile; and
wherein upon the processor determining the measured impedance value fails to correspond to any stored impedance value associated with the user profile, the instructions cause the processor to:
request user authentication credentials from the user,
receive, from an additional touch input by the user, user authentication information on a surface of the touchscreen display,
determine that the user authentication credentials matches the user profile,
measure an additional impedance value based on the additional touch input,
store the additional impedance value for the user's profile matching the authentication information, and
activate the user profile matching the user authentication information.

16. The computing device of claim 15, wherein the instructions cause the processor to:
transmit to a second device an indication of a positive user identification.

17. The computing device of claim 15, further comprising:
a touchscreen display coupled to the processor and impedance sensor, wherein the instructions cause the processor to
unlock the device based on the touch input, and
activate the user profile in response to determining the received impedance value corresponds to at least one stored impedance value associated with the user profile.

18. The computing device of claim 17, wherein instructions for activating the user profile further cause the processor to:
activate the user profile which includes a security classification, wherein the security classification further includes an owner profile, a standard user profile, or a guest profile, or
activate the user profile which includes an age classification, wherein the age classification further includes an adult profile or a child profile.

19. The computing device of claim 15, wherein the memory comprises additional instructions causing the processor to:
receive additional touch inputs from the user, and
perform ongoing impedance value measurements based on the additional touch input to refine the at least one stored impedance value associated with the user profile.

20. The computing device of claim 15, wherein the impedance sensor is configured to:
measure the impedance value associated with a first loop which includes a path traversing a chest of the user and that travels from a contact point of a first hand of the user with a surface of a touchscreen display to a contact point of a second hand of the user with at least one ground electrode of the device, or
measure the impedance value associated with a second loop which includes a path traversing the first hand of the user and that travels from a contact point of the first hand with the surface of the touchscreen display to a contact point of the first hand with the at least one ground electrode of the device.

21. The computing device of claim 15, wherein the impedance sensor is configured to:
measure additional impedance values associated with a plurality of loops, wherein at least one of the plurality of loops traverses along a distinct path of a body of the user.

* * * * *